(12) United States Patent
Arisato

(10) Patent No.: US 12,345,342 B2
(45) Date of Patent: Jul. 1, 2025

(54) CHECK VALVE DEVICE

(71) Applicant: KOSMEK LTD., Kobe (JP)

(72) Inventor: Akira Arisato, Kobe (JP)

(73) Assignee: KOSMEK LTD. (JP)

(*) Notice: Subject to any disclaimer, the term of this patent is extended or adjusted under 35 U.S.C. 154(b) by 0 days.

(21) Appl. No.: 18/696,386

(22) PCT Filed: Sep. 20, 2022

(86) PCT No.: PCT/JP2022/034875
§ 371 (c)(1),
(2) Date: Mar. 28, 2024

(87) PCT Pub. No.: WO2023/067968
PCT Pub. Date: Apr. 27, 2023

(65) Prior Publication Data
US 2024/0384805 A1   Nov. 21, 2024

(30) Foreign Application Priority Data

Oct. 19, 2021   (JP) .................................. 2021-171264

(51) Int. Cl.
F16K 15/18   (2006.01)
(52) U.S. Cl.
CPC .................................. F16K 15/1826 (2021.08)
(58) Field of Classification Search
CPC .......................... F16K 15/066; F16K 15/1826
See application file for complete search history.

(56) References Cited

U.S. PATENT DOCUMENTS 6,073,654 A * 6/2000 Dettmers .............. F15B 13/015
137/630.15
2013/0276899 A1   10/2013 Frank et al.

FOREIGN PATENT DOCUMENTS

| JP | 52-116722 | 9/1977 |
| JP | 5-133512 | 5/1993 |
| JP | 2014-503055 | 2/2014 |

OTHER PUBLICATIONS

International Search Report dated Nov. 15, 2022 issued in connection with International Application No. PCT/JP2022/034875.

* cited by examiner

Primary Examiner — P. Macade Nichols
(74) Attorney, Agent, or Firm — Merek, Blackmon & Voorhees, LLC

(57) ABSTRACT

Provided is a check valve device having a structure with which pressurized fluid is less likely to leak from a flowpath blocked by a valve. A flowpath is formed in a block, and a main valve and a sub-valve are provided in series along the flowpath. A primary-side chamber, an intermediate chamber, and a secondary-side chamber, which form a section of the flowpath, are formed in that order from the one end of the flowpath to the other end thereof. The main valve and the sub-valve are opened by a pilot valve.

1 Claim, 5 Drawing Sheets

CHECK VALVE DEVICE

TECHNICAL FIELD

The present invention relates to a check valve device, and more particularly to a technology of a check valve device that is forcibly opened by a pilot valve.

BACKGROUND ART

A conventional check valve device of this type is disclosed in Patent Document 1 (Japanese Utility Model Laid-Open No. 52-116722). The prior art is configured as follows.

An accommodation hole is vertically formed in a block. A cylindrical main valve member is inserted into the accommodation hole so as to be vertically movable. A main valve seat is circumferentially formed on the inner circumferential wall of the accommodation hole. A main valve surface capable of coming into contact with the main valve seat is circumferentially formed at the lower end of the main valve member. A cylindrical hole of the main valve member has a large-diameter hole and a small-diameter hole which are penetrated in order from the upper side. A sub-valve member is inserted into the large-diameter hole so as to be vertically movable. A sub-valve seat is formed on the periphery of the large-diameter hole side of the small-diameter hole. A sub-valve surface is circumferentially formed at the lower end of the sub-valve member to be able to come into contact with the sub-valve seat. A valve closing spring is mounted between the sub-valve member and the block, and the valve closing spring urges the sub-valve member toward the sub-valve seat, and the main valve member pushed by the sub-valve member is urged toward the main valve seat. A piston is movably inserted into the lower portion of the accommodation hole, and a pilot portion protrudes upward from the piston. The upper end small diameter portion of the pilot portion is inserted into the small-diameter hole of the main valve member, so that the pilot portion can come into contact with the sub-valve member. An advance spring mounted in an actuation chamber below the piston moves the piston upward. Further, when pressurized fluid is supplied to the actuation chamber above the piston, the piston is retracted downward. In this check valve device, a supply/discharge path as one end of the flowpath is formed on the right wall of the block to be communicated to the accommodation hole. Inside the accommodation hole, the flowpath is branched into a first branched path and a second branched path. The first branched path is composed of a valve opening gap between the valve surface and the valve seat of the main valve member. The second branched path is composed of the small-diameter hole in the main valve member, a valve opening gap between the valve surface and the valve seat of the sub-valve member, a large-diameter hole in the main valve member, and a through hole formed in the circumferential wall of the main valve member. The first branched path and the second branched path are merged at the supply/discharge path formed on the left wall of the block.

RELATED ART DOCUMENTS

Patent Documents

Patent Document 1: Japanese Utility Model Laid-Open No. 52-116722

DISCLOSURE OF THE INVENTION

Problems to be Solved by the Invention

The above conventional technology has the following problems.

The above-mentioned flowpath is divided into the first branched path and the second branched path within the block. When either the main valve that opens and closes the first branched path or the sub-valve that opens and closes the second branched path cannot be closed for some reason, for example, foreign matter such as dust is caught, compressed air (pressurized fluid) will leak out. Compared to the case where only one valve is provided in one flowpath in the block, the valve device of the conventional technology has two sets of one valve in one branched path, so that there is a high possibility that the valve cannot be closed and the pressurized fluid leaks out.

An object of the present invention is to provide a check valve device having a structure in which pressurized fluid is less likely to leak from a flowpath blocked by a valve.

Means to Solve the Problem

In order to achieve the above-mentioned object, the present invention, for example, as shown in FIGS. 1 to 4 and 5, has a check valve device configured as follows.

A main valve 3 and a sub-valve 4 are provided in series along a flowpath 2 formed in a block 1. A primary-side chamber 5, an intermediate chamber 7 and a secondary-side chamber 6, which constitute a section of the flowpath 2, are formed in order from one end side of the flowpath 2 to the other end side. A pilot valve 60 opens the main valve 3 and the sub-valve 4. The main valve 3 connects and blocks the secondary-side chamber 6 and the intermediate chamber 7. The main valve 3 is configured as follows. A cylindrical main valve member 41 is inserted into an accommodation hole 10 formed in the block 1 movably in an axial direction. A main valve surface 45, which is able to come into contact with a main valve seat 46 formed circumferentially on the inner circumferential wall of the accommodation hole 10, is formed on the outer circumferential wall of the main valve member 41. The main valve member 41 is urged toward the main valve seat 46 by a valve closing spring 47. The sub-valve 4 connects and blocks the primary-side chamber 5 and the intermediate chamber 7. The sub-valve 4 is configured as follows. A sub-valve member 50, which is inserted into a cylindrical hole 48 of the main valve member 41 movably in the axial direction, faces the main valve member 41 with a predetermined gap in the axial direction so as to be able to come into contact with the main valve member 41. A sub-valve surface 55, which is able to come into contact with a sub-valve seat 56 formed circumferentially on the inner circumferential wall of the accommodation hole 10, is formed on the outer circumferential wall of the sub-valve member 50. The pilot valve 60 has a pilot valve member 63. The pilot valve member 63 is inserted into the block 1 movably toward the sub-valve member 50, and is faced to the sub-valve member 50 with a predetermined gap so as to be able to come into contact. The pilot valve member 63 is urged away from the sub-valve member 50 by a retraction spring 66 mounted in the accommodation hole 10, and is moved toward the sub-valve member 50 by pressurized fluid supplied to an actuation chamber 76 provided in the block 1.

The present invention has the following effects.

In the above-mentioned check valve device, one flowpath is provided with a main valve and a sub-valve in series. Therefore, since pressurized fluid in the secondary-side chamber is blocked by the main valve and the sub-valve, even if one valve of the main valve and the sub-valve cannot be closed for some reason, the other valve is closed, thereby being able to prevent the pressurized fluid from leaking out from the secondary-side chamber.

PREFERRED EMBODIMENT OF THE INVENTION

Figure 1:
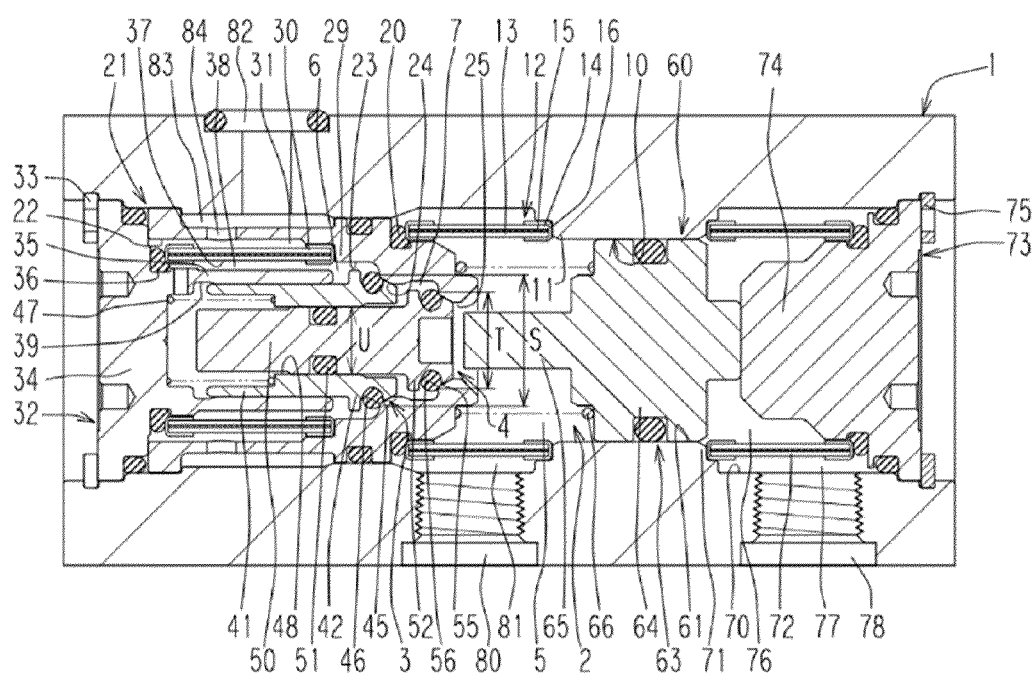
FIG. 1 is a schematic cross-sectional view of a check valve device, showing an embodiment of the present invention.
Figure 2:
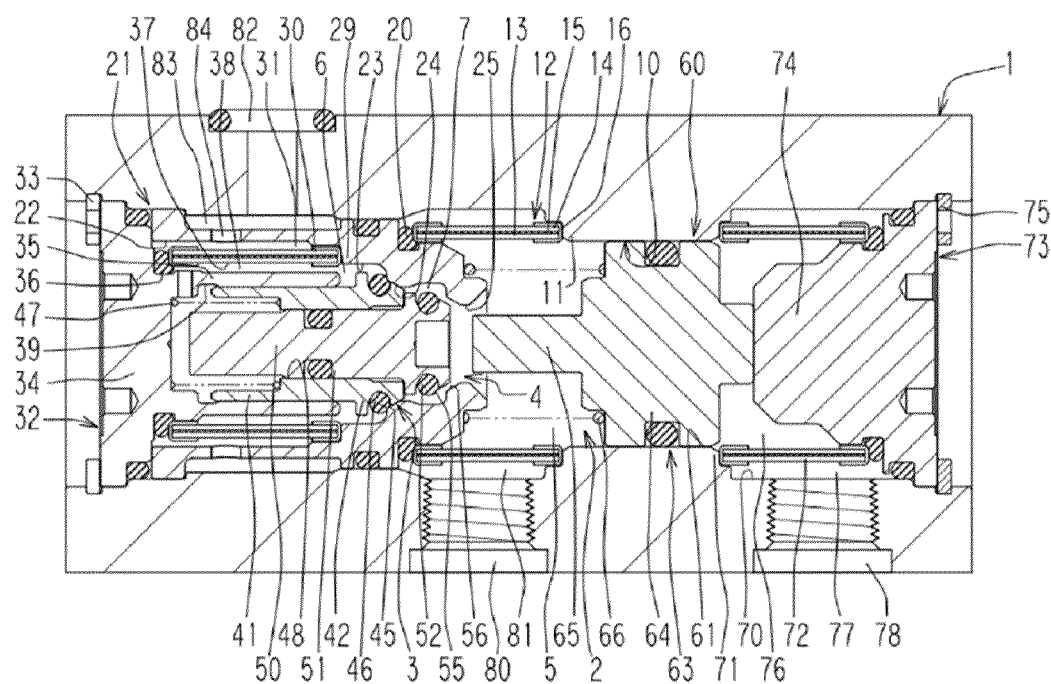
FIG. 2 is an explanatory view of the operation of the check valve device, similar to FIG. 1.
Figure 3:
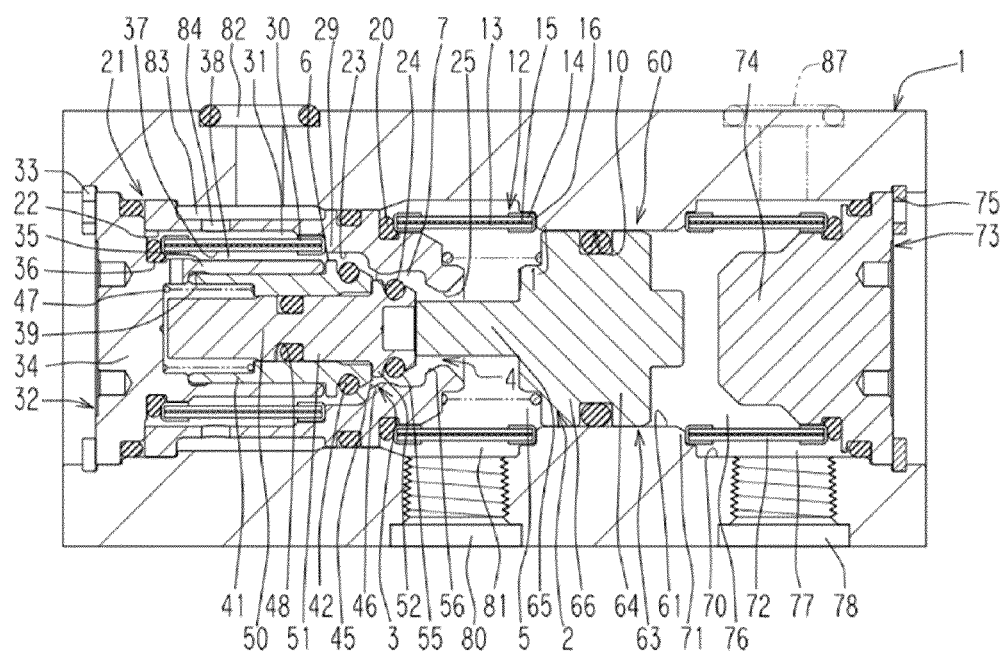
FIG. 3 is an explanatory view of the operation of the check valve device, similar to FIG. 1.
Figure 4:
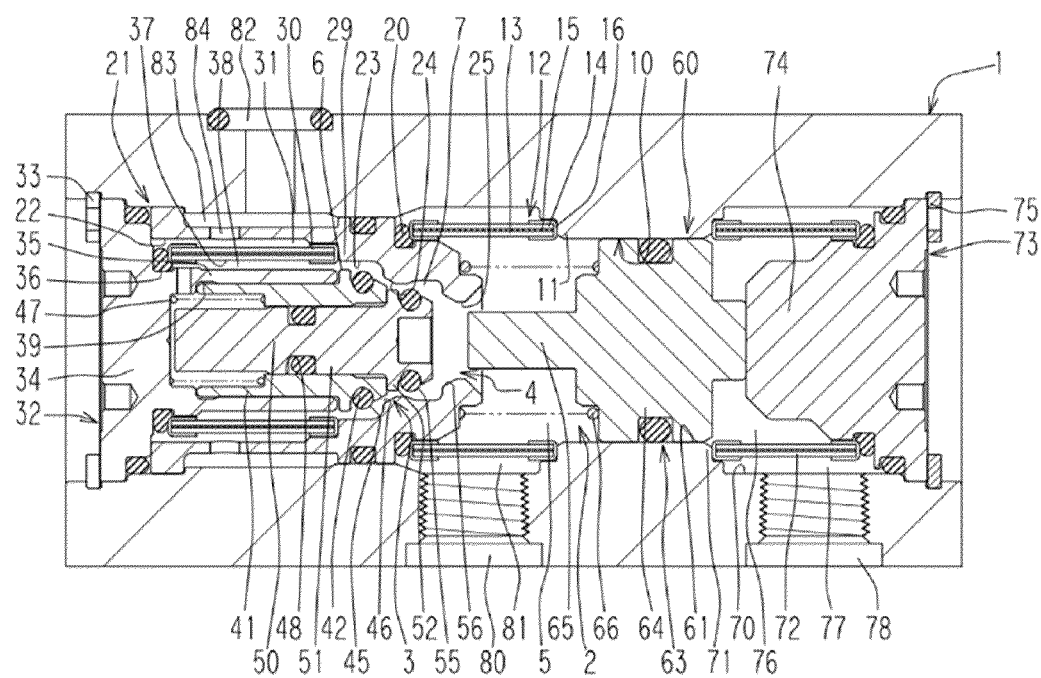
FIG. 4 is an explanatory view of the operation of the check valve device, similar to FIG. 1.

An embodiment of the present invention will be described below with reference to FIGS. 1 to 4.

A check valve device of the present invention includes one flowpath 2 for supplying and discharging compressed air (pressurized fluid) in a rectangular block 1 made of metal. A main valve 3 and a sub-valve 4 for opening and closing the flowpath 2 are arranged along the flowpath 2 so as to be in series. A primary-side chamber 5, an intermediate chamber 7 and a secondary-side chamber 6 are formed in order from one end side of the flowpath 2 to the other end side thereof so as to constitute a section of the flowpath 2. The primary-side chamber 5 is connected to a compressed air source for supplying compressed air (pressurized fluid). Also, the secondary-side chamber 6 is connected to an actuation chamber of an actuator. The main valve 3 connects and blocks the secondary-side chamber 6 and the intermediate chamber 7. Also, the sub-valve 4 connects and blocks the primary-side chamber 5 and the intermediate chamber 7. Therefore, all of the compressed air supplied from the compressed air source to the primary-side chamber 5 flows into the intermediate chamber 7 through a valve opening gap of the sub-valve 4, and then, the compressed air in the intermediate chamber 7 is supplied into the actuation chamber of the actuator through a valve opening gap of the main valve 3 and the secondary-side chamber 6.

In the above-mentioned check valve device, even if compressed air leaks from either one of the main valve 3 or the sub-valve 4 due to some cause, for example, foreign objects such as dust, etc. in a state where compressed air is supplied to the primary chamber 5 from the compressed air source and then the supply is stopped, the compressed air can be prevented from flowing out of the secondary-side chamber because the other valve is closed.

As shown in FIGS. 1 to 4, the above-mentioned check valve device is constructed as follows.

An accommodation hole 10 is formed in a rectangular metal block 1 (made of iron in this embodiment) so as to penetrate in a left-right direction. An annular stepped portion 11 is formed on the inner circumferential wall near the center of the accommodation hole 10, and a cylindrical primary-side filter 12 is inserted from the left so as to be in close contact with the stepped portion 11. The primary-side filter 12 includes a wire mesh 15 sandwiched between an inner cylinder 13 and an outer cylinder 14, and a U-shaped fixture 16 for gripping the right end of the inner cylinder 13 and the right end of the outer cylinder 14, and the left end of the inner cylinder 13 and the left end of the outer cylinder 14, respectively.

A cylindrical member 21 is hermetically inserted into the accommodation hole 10 so as to be in close contact with the left end of the primary filter 12 via a sealing member 20. The cylindrical member 21 has four holes, from first hole 22 to fourth hole 25, formed in order from the left side, and the diameter dimensions of the first hole 22 to the fourth hole 25 are smaller in order from the first hole 22. A secondary-side filter 30, which is in close contact with an annular stepped portion 29 between the first hole 22 and the second hole 23, is inserted into the first hole 22. An annular gap 31 is formed between the outer circumferential surface of the secondary-side filter 30 and the inner circumferential surface of the first hole 22. Besides, the secondary-side filter 30 is configured in the same manner as the primary-side filter 12.

A left lid member 32 engaged with the left end of the cylindrical member 21 is hermetically inserted into the accommodation hole 10, and is prevented from coming off from the accommodation hole 10 by a retaining ring 33. The left lid member 32 has a base portion 34 hermetically inserted into the accommodation hole 10 and a cylindrical portion 35 protruding rightward from the base portion 34. The right wall of the base portion 34 is in close contact with the left end of the secondary-side filter 30 via a ring-shaped sealing member 36. Therefore, the inner gap and the outer gap of the secondary-side filter 30 are partitioned by the secondary-side filter 30, the cylindrical member 21 and the left lid member 32. Further, the cylindrical portion 35 is inserted into the cylindrical hole 37 of the secondary-side filter 30 with a predetermined annular gap 38.

A cylindrical main valve member 41 of the main valve 3 is slidably inserted into a cylindrical hole 39 of the cylindrical portion 35. A flange portion 42 protrudes radially outward from the right end of the main valve member 41, and a tapered portion is formed on the outer circumferential wall of the flange portion 42 so as to be tapered toward the right side. An accommodation groove is circumferentially formed on the tapered portion, and a sealing member such as an O-ring is mounted in the accommodation groove. A main valve surface 45 is formed on the outer circumferential surface of the sealing member. The main valve surface 45 can engage with a main valve seat 46 circumferentially formed on the inner circumferential wall of the third hole 24 of the cylindrical member 35. A valve closing spring 47 is mounted between the main valve member 41 and the bottom wall of the cylindrical hole 39 of the cylindrical portion 35, and the valve closing spring 47 urges the main valve member 41 to the right toward the main valve seat 46 with respect to the left lid member 32.

A sub-valve member 50 of the sub-valve 4 is hermetically inserted into the cylindrical hole 48 of the main valve member 41 via a sealing member 51 movably in the axial direction. A flange portion 52 protrudes radially outward from the right end of the sub-valve member 50, and a tapered portion is formed on the outer circumferential wall of the flange portion 52 so as to be tapered toward the right side. An accommodation groove is circumferentially formed on the tapered portion, and a sealing member such as an O-ring is mounted in the accommodation groove. A sub-valve surface 55 is formed on the outer circumferential surface of the sealing member. The sub-valve surface 55 can engage with a sub-valve seat 56 circumferentially formed on the inner circumferential wall of the fourth hole 25 of the cylindrical member 21.

The area of the cross-section S of a sealing portion by the main valve surface 45 and the main valve seat 46 of the main valve 3 is set to be wider than the area of a cross section T of a sealing portion by the sub-valve surface 55 and the main valve seat 56 of the sub-valve 4. Therefore, the force of the compressed air in the secondary-side chamber 6 pressing the sealing portion of the main valve 3 in the closed valve state is greater than the force of the compressed air in the secondary-side chamber 6 pressing the sealing portion of the sub-valve 4 in the closed valve state. Further, the main valve member 41 is always pushed rightward by the valve closing spring 47. According to this, when the main valve 3 and the sub-valve 4 are both in the closed state, if the force of the compressed air in the primary-side chamber 5 pushing the sub-valve member 50 exceeds the force of the compressed air in the secondary-side chamber 6 pushing the sub-valve member 50, the sub-valve is opened. The compressed air flows into the intermediate chamber 7 through the valve opening gap of the sub-valve 4. At this time, the main valve 3 is still closed. Further, since the volume of the intermediate chamber 7 is made narrower than that of the primary-side chamber 5 or the secondary-side chamber 6, the pressure of the primary-side chamber 5 is prevented from abruptly changing. This can prevent repeated opening and closing operations of the sub-valve 4 (occurrence of chattering) due to rapid pressure changes, and as a result, wear and damage to the constituent members of the sub-valve 4 due to chattering can be prevented.

As mentioned above, even when the pressure in the primary-side chamber 5 reaches the pressure value at which the sub-valve 4 is opened, the main valve 3 is not opened. The pressure in the primary-side chamber 5 is subsequently increased, and when the pressure in the primary-side chamber 5 exceeds the combined force of the pressing force of the compressed air in the secondary-side chamber 6 and the urging force of the valve closing spring 47, the main valve 3 is opened. Then, the pressurized fluid in the primary-side chamber 5 and the intermediate chamber 7 flows into the secondary-side chamber 6 through the valve opening gap of the main valve 3, and the pressure in the primary-side chamber 5 drops rapidly, which may cause chattering of the main valve 3. In such a case, the main valve 3 may be affected by chattering, but the sub-valve 4 is located at a distance from the sub-valve seat 56, preventing wear and damage due to chattering.

When the sub-valve 4 and the main valve 3 are opened, the pressure difference between the primary-side chamber 5 and the secondary-side chamber 6 is eliminated, so the force with which the sub-valve member 50 is pushed from the primary-side chamber 5 side and the force with which the sub-valve member 50 is pushed from the secondary-side chamber 6 side cancel each other out. Similarly, the force with which the main valve member 41 side is pushed from the primary-side chamber 5 side and the force with which the main valve member 41 side is pushed from the secondary-side chamber 6 side cancel each other out, so that only the urging force of the valve closing spring 47 acts on the main valve member 41. Therefore, the compressed air passing through the valve opening gap of the main valve 3 experiences a pressure loss corresponding to the urging force of the valve closing spring 47, but the compressed air passing through the valve opening gap of the sub-valve 4 causes no pressure loss, or can be reduced. Therefore, the pressure loss of compressed air through the valve opening gap of the main valve 3 and the sub-valve 4 can be reduced compared to the case where the main valve 3 and the sub-valve 4 are each urged by the valve closing springs.

The above-mentioned check valve device is provided with a pilot valve 60, which switches the sub-valve 4 and the main valve 3 from the closed state to the open state, in the block 1. The pilot valve 60 is configured as follows.

A cylinder hole 61 is formed by a part of the accommodation hole 10, and the right side of the stepped portion 11 of the accommodation hole 10 is the cylinder hole 61. A pilot valve member 63 is hermetically inserted into the cylinder hole 61 so as to be movable in the axial direction. The pilot valve member 63 has a body portion 64 hermetically inserted into the cylinder hole 61 and an engagement portion 65 having a diameter smaller than that of the body portion 64 and protruding leftward. The engagement portion 65 can be inserted into the fourth hole 25 of the cylindrical member 21 and can also come into contact with the sub-valve member 50. A retraction spring 66 is mounted between the right wall of the cylindrical member 21 and the left wall of the body portion 64 of the pilot valve member 63 within the cylinder hole 61. The retraction spring 66 urges the pilot valve member 63 to the right with respect to the cylindrical member 21.

A large-diameter hole 70 constituting a part of the accommodation hole 10 is formed so as to continue to the right side of the cylinder hole 61. A cylindrical filter 72 is inserted into the large-diameter hole 70 so as to be in close contact with the stepped portion 71 between the large-diameter hole 70 and the cylinder hole 61. The filter 72 has the same structure as the primary-side filter 12 and the secondary-side filter 30. A right lid member 73 is hermetically inserted into the large-diameter hole 70 so as to be in close contact with the right end of the filter 72 via a sealing member, and a left small-diameter portion 74 of the right lid member 73 is inserted into the cylindrical hole of the filter 72. The right lid member 73 is retained in the large-diameter hole 70 by a retaining ring 75.

The body portion 64 of the pilot valve member 63 is received by the right lid member 73. An actuation chamber 76 is formed between the right surface of the pilot valve member 63 and the right lid member 73. A supply/discharge path 78 for compressed air for operation communicated to an annular gap 77 formed between the outer circumferential surface of the filter 72 and the inner circumferential surface of the large-diameter hole 70 in the actuation chamber 76 is provided on the lower right part of the block 1. Compressed air from a compressed air source is supplied and discharged through supply/discharge path 78.

In the check valve device of this embodiment, the primary-side chamber 5 is constituted by a gap between the cylindrical member 21 and the pilot valve member 63 within the accommodation hole 10. A main valve chamber (intermediate chamber) 7 is formed in a cylindrical hole of the cylindrical member 21 so as to communicate with the primary-side chamber 5. A primary-side supply/discharge path 80 is formed near the bottom center of the block 1. The primary-side supply/discharge path 80 is communicated to an annular gap 81 formed between the inner circumferential surface of the accommodation hole 10 and the outer circumferential surface of the primary-side filter 12 to be connected to a compressed air source. According to this, the compressed air from the compressed air source is supplied to and discharged from the primary-side chamber 5 through the primary-side supply/discharge path 80, the annular gap 81, and the primary-side filter 12.

A secondary supply/discharge path 82 is formed on the top left of the block 1. The secondary supply/discharge path 82 is communicated to an annular gap 83 formed between the inner circumferential surface of the accommodation hole 10 and the outer circumferential surface of the cylindrical member 21. Also, the annular gap 83 is communicated to the inside of the cylindrical hole by a through hole 84 formed in the cylindrical wall of the cylindrical member 21. Thereby, the secondary-side supply/discharge path 82 communicates with the secondary-side chamber 6 through the annular gap 83, the through hole 84, the first hole 22 of the cylindrical member 21, and the secondary-side filter 30. The secondary supply/discharge path 82 is communicated to the actuation chamber of the actuator.

In this embodiment, the flowpath 2 includes the primary-side supply/discharge path 80, the annular gap 81, the primary-side chamber 5, the intermediate chamber 7, the secondary-side chamber 6, the through hole 84, the annular gap 83, the secondary-side supply/discharge path 82, and the like.

The above check valve device, as shown in FIGS. 1 to 4, operates as follows.

In an initial state (valve closed state) of FIG. 1, the compressed air in the primary-side supply/discharge path 80 is discharged to the outside. The compressed air in the supply/discharge path 78 for operation is also discharged to the outside. Therefore, the compressed air pressure in the primary-side chamber 5 communicating with the primary-side supply/discharge path 80 is about the atmospheric pressure. Therefore, the pressing force due to the compressed air pressure in the secondary-side chamber 6 and the urging force of the valve closing spring 47 move the main valve member 41 rightward, the main valve surface 45 of the main valve member 41 is engaged with the main valve seat 46, and the main valve 3 is closed. Further, the pressing force due to the compressed air pressure in the secondary-side chamber 6 moves the sub-valve member 50 rightward, the sub-valve surface 55 of the sub-valve member 50 is engaged with the sub-valve seat 56, and the sub-valve 4 is closed.

When the compressed air from the compressed air source is supplied to the actuator via the check valve device, first, the compressed air is supplied from the compressed air source to the primary-side chamber 5 through the primary-side supply/discharge path 80 and the primary-side filter 12. At this time, the actuation chamber 76 is not supplied with compressed air from the compressed air source. Then, the pressing force due to the compressed air pressure in the primary-side chamber 5 and the urging force of the retraction spring 66 push the pilot valve member 63 rightward, and the pilot valve member 63 is received by the right lid member 73 from the right side. Also, the compressed air in the primary-side chamber 5 pushes the sub-valve member 50 leftward. When the pressing force due to the compressed air pressure in the primary-side chamber 5 exceeds the pressing force due to the compressed air pressure in the secondary-side chamber 6, the compressed air in the primary-side chamber 5 moves the sub-valve member 50 leftward. According to this, the sub-valve surface 55 is separated from the sub-valve seat 56 and the sub-valve 4 is opened. Therefore, the compressed air in the primary-side chamber 5 flows into the intermediate chamber 7 through the valve opening gap. When the pressing force due to the compressed air pressure in the intermediate chamber 7 exceeds the combined force of the pressing force due to the compressed air pressure in the secondary-side chamber 6 and the urging force of the valve closing spring 47, the compressed air in the intermediate chamber 7 moves the sub-valve member 50 and the main valve member 41 to the left. Therefore, the main valve surface 45 is separated from the main valve seat 46 and the main valve 3 is opened. Therefore, the compressed air from the compressed air source is supplied to the actuation chamber of the actuator through the primary-side chamber 5, the intermediate chamber 7, the secondary-side chamber 6 and the secondary-side supply/discharge path 82.

When the supply of compressed air from the compressed air source is stopped, the pressing force due to the compressed air pressure in the secondary-side chamber 6 and the urging force of the valve closing spring 47 move the main valve member 41 rightward, and the main valve 3 is closed. Further, the pressing force due to the compressed air pressure in the secondary-side chamber 6 moves the sub-valve member 50 rightward, and the sub-valve 4 is closed.

When the compressed air in the actuation chamber of the actuator is discharged to the outside, the compressed air in the primary-side chamber 5 is discharged to the outside and the compressed air from the compressed air source is supplied into the actuation chamber 76 through the supply/discharge path 78 for operation and the filter 72. Then, the pressing force due to the compressed air pressure in the actuation chamber 76 moves the pilot valve member 63 leftward against the urging force of the retraction spring 66. Next, the engaging portion 65 of the pilot valve member 63 is inserted into the cylindrical hole of the cylindrical member 21, pushing the sub-valve member 50 leftward to open the sub-valve 4. Subsequently, the flange portion 52 of the sub-valve member 50 pushes the main valve member 41 leftward to open the main valve 3. Therefore, the compressed air in the actuation chamber of the actuator is discharged outside through the check valve device.

The above embodiment has the following advantages.

In the above-mentioned check valve device, one flowpath 2 is provided with a main valve 3 and a sub-valve 4 in series. Therefore, the compressed air in the secondary-side chamber 6 is blocked by the main valve 3 and the sub-valve 4, so that even if one valve of the main valve and the sub-valve cannot be closed for some reason, the other valve is closed to prevent pressurized fluid from leaking out of the secondary-side chamber 6.

Figure 5:
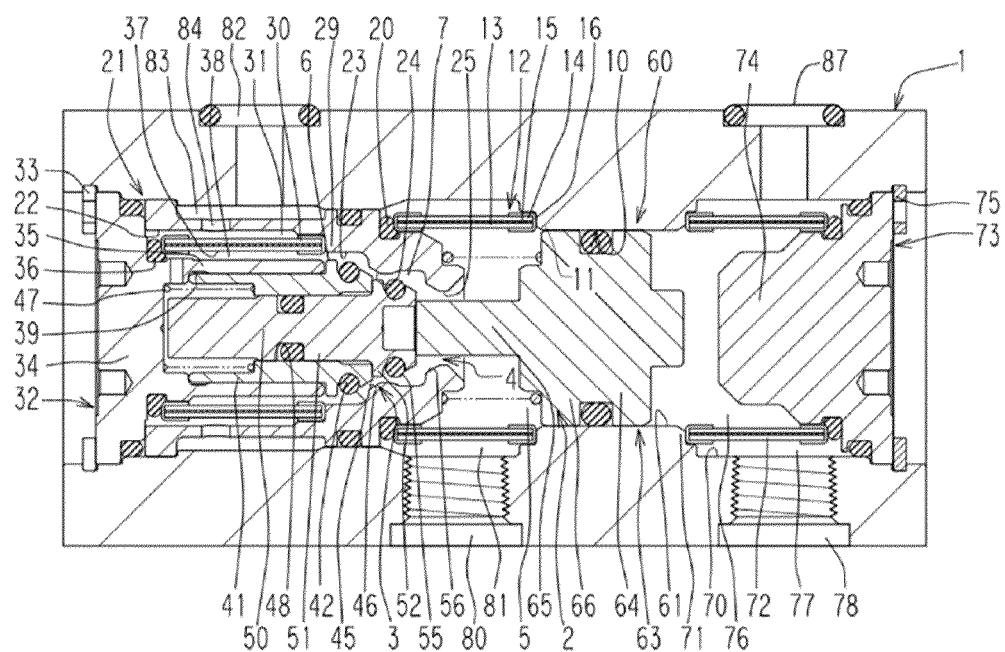
FIG. 5 is a check valve device showing a variation of the above-mentioned embodiment, and is a view similar to FIG. 4.

FIG. 5 shows a variation of the embodiment of the invention. In this variation of the embodiment, the same reference numerals are given to the same (or similar) members as those of the above embodiments.

The differences of the variation from the above-mentioned embodiment are as follows.

As shown in FIG. 5, a first supply/discharge path 78 for operation communicated to the large-diameter hole 70 of the accommodation hole 10 is formed on the lower right part of the block 1. The first supply/discharge path 78 is communicated to the compressed air source. A second supply/discharge path 87 for operation that is communicated to the large-diameter hole 70 of the accommodation hole 10 is formed on the upper right side of the block 1. The second supply/discharge path 87 is communicated to the release chamber, which is an actuation chamber of the actuator. Further, the secondary-side supply/discharge path 82 is communicated to a lock chamber, which is an actuation chamber of the actuator.

When the compressed air in the lock chamber of the actuator is discharged to the outside, the compressed air in the primary-side chamber 5 is discharged. Compressed air from the compressed air source is supplied to the release chamber of the actuator through the first supply/discharge path 78, the filter 72, and the second supply/discharge path 87 for operation, and the compressed air supplied into the actuation chamber 76 moves the pilot valve member 63 leftward. Next, the engaging portion 65 of the pilot valve member 63 is inserted into the cylindrical hole 39 of the cylindrical member 21, and pushes the sub-valve member 50 leftward to open the sub-valve 4. Subsequently, the flange portion 52 of the sub-valve member 50 pushes the tip of the main valve member 41 leftward to open the main valve 3. Thereby, the secondary-side supply/discharge path 82 is communicated to the primary-side supply/discharge path 80 through the main valve chamber 7 and the sub-valve chamber 5. Therefore, the compressed air in the lock chamber of the actuator is discharged to the outside through the flowpath 2 of the check valve device.

Each of the above embodiments can be modified as follows.

The pressurized fluid may be another gas or a liquid such as pressurized oil or water instead of the exemplified compressed air.

In addition, it is needless to say that various variations can be made within the range that can be assumed by those skilled in the art.

DESCRIPTION OF THE PREFERENCE NUMERAL

1 block
2 flowpath
3 main valve
4 sub-valve
5 primary-side chamber
6 secondary-side chamber
7 intermediate chamber
10 accommodation hole
41 main valve member
45 main valve surface
46 main valve seat
47 valve closing spring
48 cylindrical hole
50 sub-valve member
55 sub-valve surface
56 sub-valve seat
60 pilot valve
63 pilot valve member
66 retraction spring
76 actuation chamber

The invention claimed is:

1. A check valve device, comprising:
a main valve and a sub-valve provided in series along a flowpath formed in a block;
a primary-side chamber, an intermediate chamber, and a secondary-side chamber forming a section of the flowpath; and
a pilot valve for opening the main valve and the sub-valve, said main valve for connecting and blocking the secondary-side chamber and the intermediate chamber, said main valve comprising:
a cylindrical main valve member configured to be movable in an axial direction in an accommodation hole formed in the block;
a main valve surface formed on an outer circumferential wall of the cylindrical main valve member so as to be able to come into contact with a main valve seat formed circumferentially on an inner circumferential wall of the accommodation hole; and,
a valve closing spring for urging the cylindrical main valve member toward the main valve seat;
said sub-valve for connecting and blocking the primary-side chamber and the intermediate chamber, said sub-valve comprising:
a sub-valve member configured to be movable in the axial direction in a cylindrical hole of the cylindrical main valve member and to face the cylindrical main valve member with a predetermined gap in the axial direction so as to be able to come into contact with the cylindrical main valve member; and,
a sub-valve surface formed on an outer circumferential wall of the sub-valve member so as to be able to come into contact with a sub-valve seat formed circumferentially on the inner circumferential wall of the accommodation hole, and,
said pilot valve comprising a pilot valve member to be inserted into the block to be movable toward the sub-valve member and to face the sub-valve member with a predetermined gap so as to be able to come into contact with the sub-valve member, said pilot valve member being urged away from the sub-valve member by a retraction spring mounted in the accommodation hole and being moved toward the sub-valve member by pressurized fluid supplied to an actuation chamber provided in the block.

* * * * *